United States Patent
Naruse et al.

(10) Patent No.: US 12,228,935 B2
(45) Date of Patent: Feb. 18, 2025

(54) AGRICULTURAL VEHICLE, CONTROL DEVICE, AND CONTROL METHOD

(71) Applicant: Legmin inc., Fukaya (JP)

(72) Inventors: Takahiro Naruse, Shizuoka (JP); Hirosato Maruyama, Shizuoka (JP); Taisuke Yamazaki, Shizuoka (JP); Shuhei Kiyokawa, Shizuoka (JP)

(73) Assignee: LEGMIN INC., Fukaya (JP)

( * ) Notice: Subject to any disclaimer, the term of this patent is extended or adjusted under 35 U.S.C. 154(b) by 165 days.

(21) Appl. No.: 17/940,850

(22) Filed: Sep. 8, 2022

(65) Prior Publication Data

US 2023/0004162 A1  Jan. 5, 2023

Related U.S. Application Data

(63) Continuation of application No. PCT/JP2021/003714, filed on Feb. 2, 2021.

(30) Foreign Application Priority Data

Mar. 26, 2020 (JP) ................. 2020-056603

(51) Int. Cl.
 *G05D 1/00* (2024.01)
 *A01B 69/04* (2006.01)
 *G05D 1/246* (2024.01)

(52) U.S. Cl.
 CPC ......... *G05D 1/0214* (2013.01); *A01B 69/008* (2013.01); *G05D 1/0223* (2013.01); *G05D 1/0231* (2013.01); *G05D 1/2462* (2024.01)

(58) Field of Classification Search
 CPC .. G05D 1/0214; G05D 1/0223; G05D 1/0231; G05D 1/024; G05D 1/24;
 (Continued)

(56) References Cited

U.S. PATENT DOCUMENTS

| 6,389,785 B1 | 5/2002 | Dickhans et al. |
| 2003/0020007 A1* | 1/2003 | Andersen ............. A01B 69/024 250/221 |

(Continued)

FOREIGN PATENT DOCUMENTS

| JP | 2006-101816 | 4/2006 |
| JP | 2007-185111 | 7/2007 |

(Continued)

OTHER PUBLICATIONS

International Search Report, International Application No. PCT/JP2021/003714, Date of mailing: Apr. 27, 2021, 3 pages.

*Primary Examiner* — Abby Y Lin
*Assistant Examiner* — Esvinder Singh
(74) *Attorney, Agent, or Firm* — Rankin, Hill & Clark LLP

(57) ABSTRACT

A control device includes a direction identifying data generator that generates direction identifying data including at least a portion of acquired point group data indicating a position of a region including the ridge in front of an agricultural vehicle in a traveling direction, a direction identification part that identifies a direction of the ridge on the basis of the direction identifying data, and a travel control part that controls the agricultural vehicle such that the agricultural vehicle travels in the direction of the ridge identified by the direction identification part.

14 Claims, 7 Drawing Sheets

(58) Field of Classification Search
CPC .... G05D 1/2462; G05D 1/646; G05D 1/2465; A01B 69/008; A01B 69/001; A01B 69/007; A01B 69/02; A01B 13/02; A01B 39/14; G01S 7/4802; G01S 17/88; G01S 17/89; G01S 17/10; G01S 17/06; G01C 7/04

See application file for complete search history.

(56) References Cited

U.S. PATENT DOCUMENTS

| | | | |
|---|---|---|---|
| 2020/0057453 A1* | 2/2020 | Laws | G05D 1/0088 |
| 2020/0390022 A1* | 12/2020 | Stanhope | G01C 7/04 |
| 2021/0084805 A1* | 3/2021 | Cozza | A01B 79/005 |
| 2021/0337734 A1* | 11/2021 | Jeanty | B65G 47/902 |
| 2022/0155794 A1* | 5/2022 | Madsen | G01C 21/30 |

FOREIGN PATENT DOCUMENTS

| | | |
|---|---|---|
| JP | 2016-012348 | 1/2016 |
| JP | 2016-208871 | 12/2016 |
| JP | 2019-062816 | 4/2019 |
| JP | 2019-135963 | 8/2019 |
| KR | 10-2020-0030477 A | 3/2020 |

\* cited by examiner

Δh

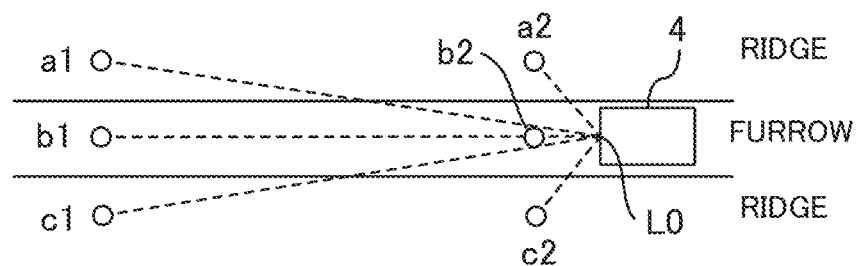
FIG. 4A
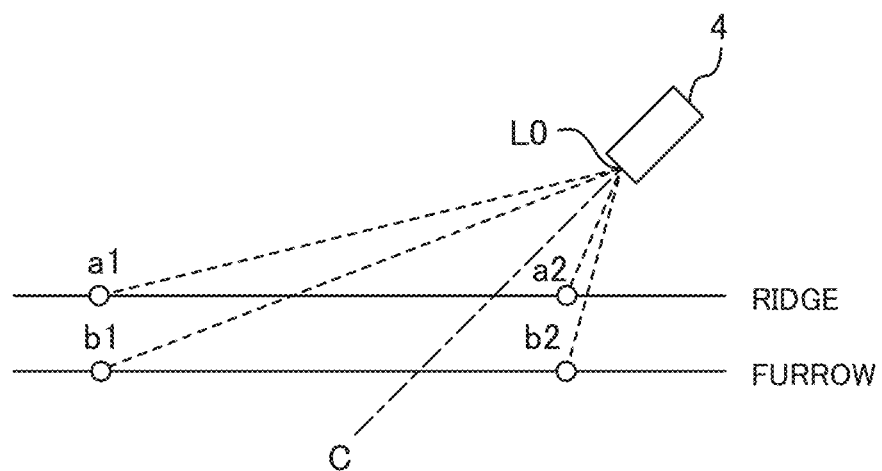
FIG. 4B
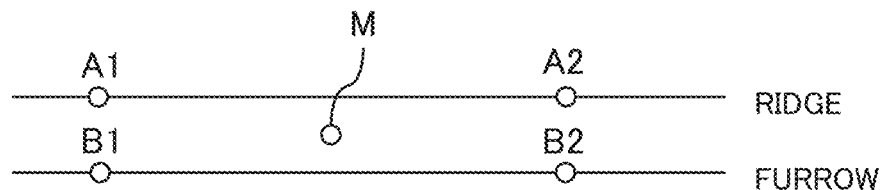
FIG. 4C
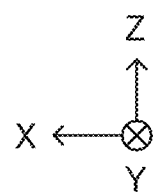

AGRICULTURAL VEHICLE, CONTROL DEVICE, AND CONTROL METHOD

CROSS-REFERENCE TO RELATED APPLICATIONS

The present application is a continuation application of International Application number PCT/JP2021/003714, filed on Feb. 2, 2021, which claims priority under 35 U.S.C. § 119(a) to Japanese Patent Application No. 2020-056603, filed on Mar. 26, 2020. The contents of these applications are incorporated herein by reference in their entirety.

BACKGROUND OF THE DISCLOSURE

The present disclosure relates to an agricultural vehicle, a control device, and a control method for controlling the agricultural vehicle.

Conventionally, as Japanese Unexamined Patent Application Publication No. 2019-062816 discloses, there is known an agricultural vehicle that detects a position of a ridge in a width direction in a field and travels while controlling a position of the vehicle in a width direction on the basis of the detected position.

A conventional agricultural vehicle measures a distance between a ridge and an ultrasonic sensor provided in the agricultural vehicle, and controls a position of the agricultural vehicle in the left-right direction on the basis of the measured distance. Thus, the conventional agricultural vehicle has a problem that the agricultural vehicle frequently moves in the left-right direction when a part of the ridge is collapsed or the ridge is uneven.

BRIEF SUMMARY OF THE DISCLOSURE

The present disclosure focuses on these points, and an object of the present disclosure is to improve stability when the agricultural vehicle travels along a direction of the ridge.

A control device according to the first embodiment of the present disclosure is a control device for controlling an agricultural vehicle that travels in a field where a ridge is formed, the control device includes a direction identifying data generator that generates direction identifying data including at least a portion of acquired point group data indicating a position of a region including the ridge in front of the agricultural vehicle in a traveling direction, a direction identification part that identifies a direction of the ridge on the basis of the direction identifying data, and a travel control part that controls the agricultural vehicle such that the agricultural vehicle travels along the direction of the ridge identified by the direction identification part.

A control method according to the second embodiment of the present disclosure is a method implemented by a computer for controlling an agricultural vehicle that travels in a field where a ridge is formed, the control method includes the steps of generating direction identifying data including at least a portion of acquired point group data indicating a position of a region including the ridge in front of the agricultural vehicle in a traveling direction, identifying a direction of the ridge on the basis of the direction identifying data, and controlling the agricultural vehicle such that the agricultural vehicle travels in the identified direction of the ridge.

An agricultural vehicle according to the third embodiment of the present disclosure is an agricultural vehicle that travels in a field where a ridge is formed, the agricultural vehicle includes a control device that controls the agricultural vehicle, and a laser irradiation device that transmits acquired point group data acquired by radiating pulsed laser light in front of the agricultural vehicle in a traveling direction, to the control device, wherein the control device includes a direction identifying data generator that generates direction identifying data including at least a portion of the acquired point group data indicating a position of a region including the ridge in front of the agricultural vehicle in a traveling direction, a direction identification part that identifies a direction of the ridge on the basis of the direction identifying data, and a travel control part that controls the agricultural vehicle such that the agricultural vehicle travels along the direction of the ridge: identified by the direction identification part.

BRIEF DESCRIPTION OF THE DRAWINGS

FIGS. 4A to 4C are schematic diagrams for explaining an operation in which a three-dimensional data generator generates three-dimensional data.

DETAILED DESCRIPTION OF TI-IE DISCLOSURE

Hereinafter, the present disclosure will be described through exemplary embodiments, but the following exemplary embodiments do not limit the disclosure according to the claims, and not all of the combinations of features described in the exemplary embodiments are necessarily essential to the solution means of the disclosure.

<Outline of Agricultural Vehicle S>

Figure 1:
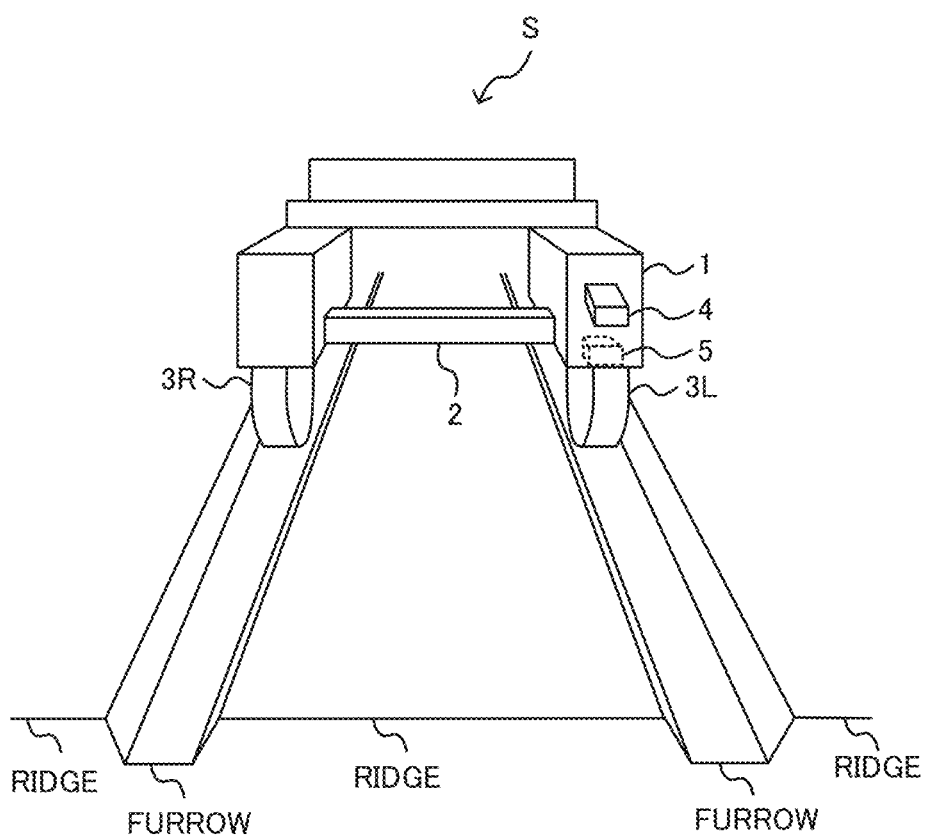
FIG. 1 is a schematic diagram of an appearance of an agricultural vehicle.

FIG. 1 shows a schematic diagram of an appearance of an agricultural vehicle S. The agricultural vehicle S is a vehicle that travels in a field where a ridge is formed, and is used for farm work (for example, an operation of seeding, spraying agrochemicals, watering, cutting and monitoring) for growing and harvesting crops in the field. The agricultural vehicle S automatically travels along the ridge. The agricultural vehicle S includes a main body 1, an actuating mechanism 2, wheels 3 (a wheel 3L and a wheel 3R), a laser irradiation device 4, and a control device 5. It should be noted that although two wheels 3 are shown in FIG. 1, it is assumed that the agricultural vehicle S has four wheels 3 including front wheels and rear wheels. The number of the wheels 3 is arbitrary.

Although the shape of the main body 1 is arbitrary, the main body 1 shown in FIG. 1 has a symmetrical shape. The main body 1 has the actuating mechanism 2 which has a width in the left-tight direction larger than the width of the ridge and moves above the ridge. The actuating mechanism 2 is formed by a mechanical component, such as an actuator which operates to cut off crops planted in the ridge or to harvest crops.

The wheels 3 are provided to both sides of the main body 1 and move in furrows formed between ridges. The space between the wheel 3L and the wheel 3R may be adjustable in accordance with the width of the ridge (that is, the space between the furrows).

The laser irradiation device 4 is a device that radiates a pulsed laser light to the front of the agricultural vehicle S in the traveling direction, and is a Light Detection and Ranging (LiDAR) device, for example. The laser irradiation device 4 is fixed to the front face of the main body 1 and radiates laser light in a plurality of directions towards the ridge and the furrow in front of the agricultural vehicle S to detect the laser light reflected by the ridge and the furrow. The laser irradiation device 4 switches the direction in which the laser light is radiated at every predetermined period of time, for example.

The laser irradiation device 4 identifies positions where the laser light has been reflected by the ridge and the furrow, and generates point group data corresponding to the positions where the laser light has been reflected. The point group data includes information indicating the relationship between the central direction of a range in which the laser irradiation device 4 radiates the laser light and the position where the laser light has been reflected (e.g., an angle with respect to the central direction), and a distance between the laser irradiation device 4 and the position where the laser light has been reflected. An irradiation time of one pulse of the laser light may be any length, and is 1 ns, for example, although the irradiation time affects the required resolution of the position and the distance.

The control device 5 is a device that controls a traveling direction of the agricultural vehicle S, and is a computer that operates by executing a program, for example. The control device 5 analyzes the point group data acquired from the laser irradiation device 4 to identify the direction of the ridge, and controls the orientation of the wheel 3 such that the agricultural vehicle S travels in the identified direction.

Hereinafter, the configuration and operations of the control device 5 will be described in detail <Configuration of Control Device 5>

Figure 2:
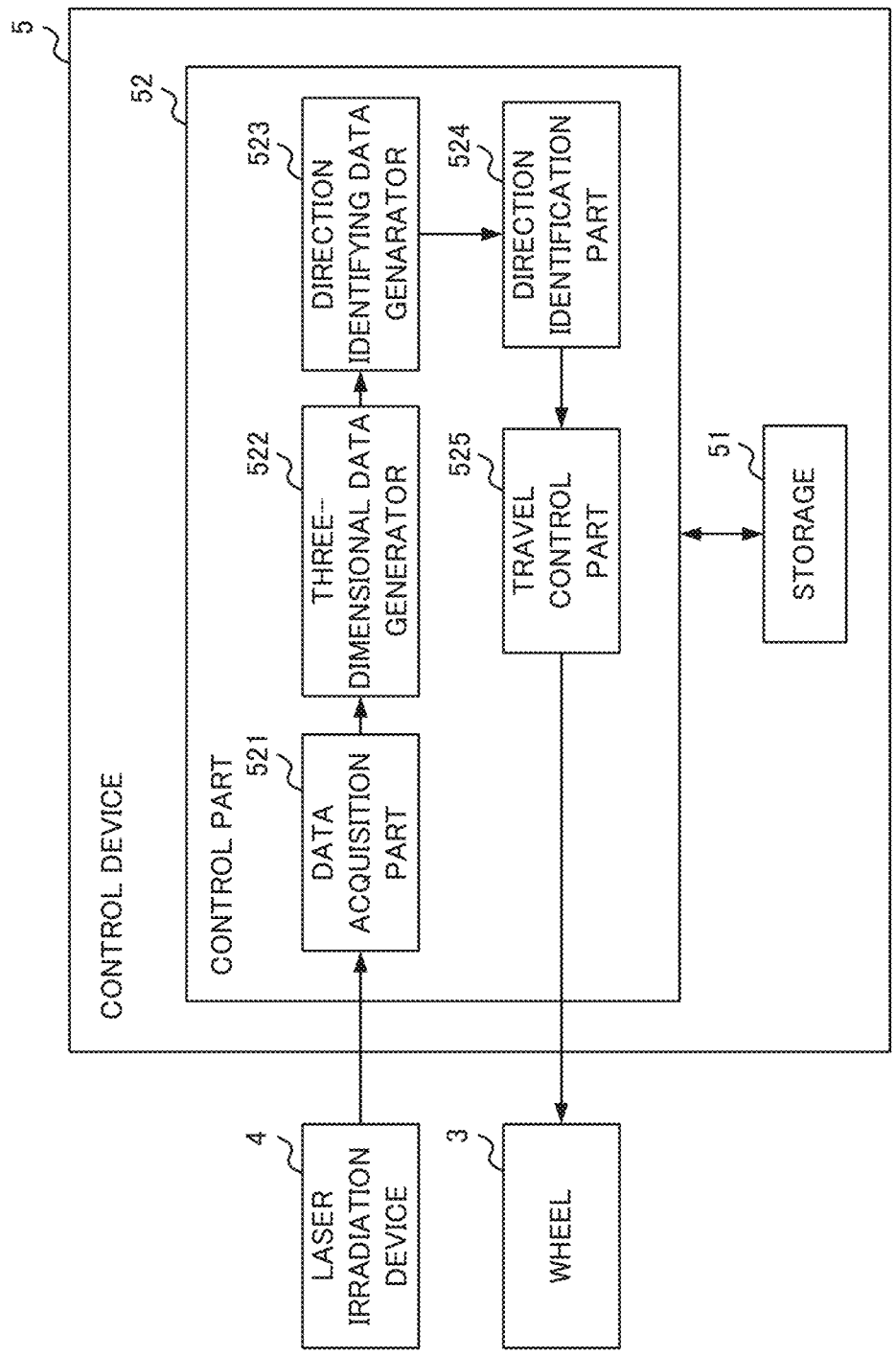
FIG. 2 shows a configuration of a control device.

FIG. 2 shows a configuration of the control device 5. The control device 5 includes a storage 51 and a control part 52.

The storage 51 includes a storage medium, such as a Read Only Memory (ROM), a Random Access Memory (RAM), or a hard disk. The storage 51 stores the point group data generated by the laser irradiation device 4. In addition, the storage 51 stores a program to be executed by the control part 52.

The control part 52 is a Central Processing Unit (CPU), for example. The control part 52 functions as a data acquisition part 521, a three-dimensional data generator 522, a direction identifying data generator 523, a direction identification part 524, and a travel control part 525 by executing a program stored in the storage 51.

The data acquisition part 521 acquires the point group data generated by the laser irradiation device 4, from the laser irradiation device 4. The data acquisition part 521 notifies the three-dimensional data generator 522 of the acquired point group data. The data acquisition part 521 may acquire the point group data associated with time information at a predetermined interval, and may store the point group data that the data acquisition part 521 acquired (hereinafter, sometimes referred to as "acquired point group data") in the storage 51 in association with the time information.

The three-dimensional data generator 522 generates three-dimensional data indicating the three-dimensional geometry of an area irradiated with the laser light by the laser irradiation device 4, on the basis of the point group data acquired via the data acquisition part 521. The three-dimensional data generator 522 generates three-dimensional data on the basis of the point group data acquired by the data acquisition part 521 over a predetermined period of time. The predetermined period of time is a time required for the data acquisition part 521 to acquire a sufficient amount of point group data for the direction identification part 524 to identify the direction of the ridge.

On the basis of the relationship between the position of the laser light irradiation source and the irradiation position of the laser light in the laser irradiation device 4, the three-dimensional data generator 522 generates three-dimensional data corresponding to a three-dimensional geometry of a region with a horizontal plane as a reference by converting the position of the acquired point group data in a three-dimensional space. Specifically, the three-dimensional data generator 522 generates three-dimensional data in which multiple coordinates of the irradiation position that are the same height in the height direction of the agricultural vehicle S are represented by the same value.

Figure 3A:
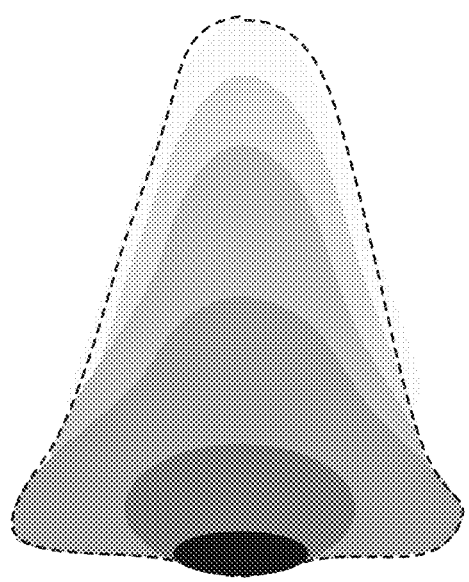
FIGS. 3A to 3C are schematic diagrams of point group data.
Figure 3B:
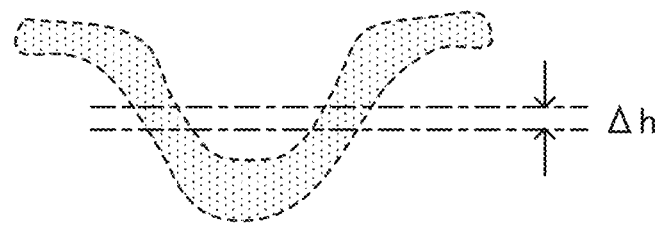
Figure 3C:
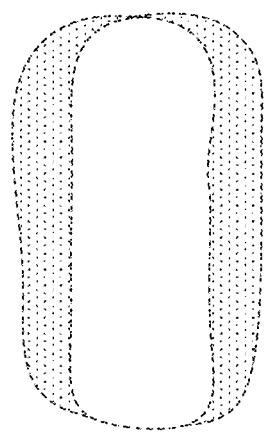

FIGS. 3A to 3C are schematic diagrams of the point group data. The region surrounded by a dotted line in FIG. 3A indicates a region including the acquired point group data acquired by the data acquisition part 521, and is indicated with density corresponding to the distance from the irradiation source of the laser irradiation device 4 to the position irradiated with the laser light, or the reflectance of the laser light. In FIGS. 3A to 3C, the larger the distance from the irradiation source of the laser irradiation device 4 to the position irradiated with the laser light is, the lighter the indicated color is.

FIG. 3B is a schematic diagram showing a state where the three-dimensional data generated by the three-dimensional data generator 522 is recognized from the horizontal direction (e.g., the direction of the traveling surface). FIG. 3C is a schematic diagram showing a state where the point group data in a height range (Δh) surrounded by two one-dot chain lines in the three-dimensional data shown in FIG. 313 is recognized from above.

FIGS. 4A to 4C are schematic diagrams for explaining an operation in which the three-dimensional data generator 522 generates three-dimensional data. FIG. 4A shows a state where a part of the point group data is recognized from above the field, and FIG. 4B shows a state where a part of the point group data is recognized in the horizontal direction. In the figures, broken lines indicate laser lights, and a circle indicates a piece of point data in the point group data. The sign L0 in FIGS. 4A and 4B indicates the position of the laser light irradiation source, and the one-dot chain line indicates a central direction C of a laser light irradiation range.

The pieces of point data a1, b1, and c1 correspond to positions furthest from the laser irradiation device 4 in the laser light irradiation range, and the pieces of point data a2, b2, and c2 correspond to positions closest to the laser irradiation device 4 in the laser light irradiation range. The pieces of point data a1, c1, a2, and c2 correspond to positions at which the ridges are irradiated with the laser light, and the pieces of point data b1 and b2 correspond to positions at which the furrow is irradiated with the laser light. In the acquired point group data, a position of each piece of point data is represented on the basis of the distance from the irradiation source L0 and the angle from a central irradiation direction C of the laser light, for example.

Since the laser irradiation device 4 radiates the laser light in an inclined direction, the point data a1 is located above the central irradiation direction C, and the point data a2 is located below the central irradiation direction C with the central irradiation direction C of the laser light as a reference, although in fact the pieces of point data a1 and a2 are at the same height. Similarly, although in fact the pieces of point data b1 and b2 are at the same height, the point data b1 is located above the central irradiation direction C, and the point data b2 is located below the central irradiation direction C. Accordingly, the three-dimensional data generator 522 generates three-dimensional data by converting the coordinates of these pieces of point data into coordinates in the three-dimensional space in which the traveling direction of the agricultural vehicle S is the horizontal direction.

To generate three-dimensional data, the three-dimensional data generator 522 first extracts acquired point group data within a predetermined range in the depth direction or the width direction. Subsequently, on the basis of each position of a plurality of pieces of point data included in the acquired point group data that was extracted, the three-dimensional data generator 522 identifies a position that is the center of the plurality of pieces of point data (e.g., the central position M in FIGS. 4A to 4C). The three-dimensional data generator 522 then generates three-dimensional data by rotating the coordinates of the acquired point group data, with the identified central position M as a rotation center. That is, the three-dimensional data generator 522 generates three-dimensional data by calculating coordinates of point data in the three-dimensional space in which the traveling direction of the agricultural vehicle S is the X direction, the left-right direction is the Y direction, and the height direction is the Z direction. It should be noted that the three-dimensional data generator 522 may remove point data that deviates from a predetermined range in the Z direction as noise.

In an example shown in FIG. 4C, the three-dimensional data generator 522 converts the coordinates of the point data a1 into A1, and converts the coordinates of the point data a2 into A2 in which the coordinates in the Z direction and Y direction are the same as those of A1 and the coordinate in the X direction is different from that of A1. The three-dimensional data generator 522 converts the coordinates of the point data b1 into B in which the coordinate in the X direction is the same as that of A1 and coordinates in the Y direction and the Z direction are different from those of A1. The three-dimensional data generator 522 notifies the direction identifying data generator 523 of the generated three-dimensional data in this manner.

The direction identifying data generator 523 generates direction identifying data including at least a part of the acquired point group data indicating the position of the region including the ridge in the front of the agricultural vehicle S in the traveling direction. The direction identifying data generator 523 generates direction identifying data including point group data corresponding to a predetermined range effective for identifying the direction of the ridge, for example. The direction identifying data generator 523 generates direction identifying data on the basis of acquired point group data acquired by radiating a pulsed laser it with the laser irradiation device 4, for example. The direction identifying data generator 523 generates the direction identifying data used to identify the direction of the ridge by extracting a portion of the point group data corresponding to a predetermined range effective for identifying the direction of the ridge from the point group data included in the three-dimensional data generated on the basis of the acquired point group data, for example. The direction identifying data generator 523 notifies the direction identification part 524 of the generated direction identifying data.

As an example, the direction identifying data generator 523 generates the direction identifying data by selecting the point group data corresponding to a predetermined range lower than the upper surface of the ridge from among the point group data included in the three-dimensional data. The predetermined range is a range of height between the lowest position in the ridge and the lowest position in the furrow, for example. Since the direction identifying data generator 523 generates the direction identifying data using the point group data in a range lower than the upper surface of the ridge in this manner, the point group data generated by irradiating crops planted on the ridge is not included in the direction identifying data, and so the accuracy of identifying the direction of the ridge is improved. Further, even in a case where the ridge is provided with a tunnel or a supporting pole, the upper portion of the ridge is missing, or irregular reflection occurs above the ridge, the accuracy of identifying the direction of the ridge is improved.

The direction identifying data generator 523 generates direction identifying data as shown in FIG. 3C by selecting point group data within a range defined by an upper surface and a lower surface parallel to a horizontal surface (e.g., a surface bordering the uppermost ends of the four wheels 3, the agricultural vehicle S, for example. The direction identifying data generator 523 may generate a plurality of pieces of direction identifying data including pieces of point group data corresponding to a plurality of predetermined ranges lower than the ridge, with each piece of point group data corresponding to the same height range. The direction identifying data generator 523 generates a plurality of pieces of direction identifying data corresponding to a range including a straight line connecting a plurality of wheels 3L on the left side of the agricultural vehicle S and a range including a straight line connecting a plurality of wheels 3R on the right side of the agricultural vehicle S, for example.

It should be noted that a method by which the direction identifying data generator 523 generates the direction identifying data is arbitrary. The direction identifying data generator 523 may generate the direction identifying data by calculating the slope of an approximate curve based on a portion of points extracted from a plurality of points included in the point group data, for example. In this case, the direction identifying data generator 523 may calculate inclinations of a plurality of pieces of triangle-shaped polygon data formed by three close points to generate statistical values of a plurality of calculated inclinations as direction identifying data. Further, from among a plurality of templates of the direction identifying data indicating the shape of the ridge, the direction identifying data generator 523 may select the template of the direction identifying data that matches the largest number of point groups.

The direction identification part 524 identifies the direction of the ridge on the basis of the direction identifying data generated by the direction identifying data generator 523, The direction identification part 524 identifies the direction of the ridge by calculating an approximate straight line using a method such as a least-squares method or a robust estimation method on the basis of point group data corresponding to a predetermined height included in the direction identifying data, for example. The direction identification part 524 calculates an approximate straight line of the region in the longitudinal direction surrounded by the outline of the region including the point group data, thereby identifying the direction of the region with the same height, for example.

The direction identification part 524 determines that a region with a height equal to or greater than a predetermined height is a region of the ridge and a region with a height less than the predetermined height is a region of the furrow, among the regions in which the direction is identified. The direction identification part 524 identifies the longitudinal directions of the identified ridge and furrow as the direction of the ridge and the direction of the furrow.

When the direction identifying data generator 523 generates a plurality of pieces of direction identifying data, the direction identification part 524 identifies the direction of the ridge on the basis of each of the plurality of pieces of direction identifying data. The direction identification part 524 identifies a statistical value (e.g., an average value or a median value) of the direction of the ridge identified on the basis of each of the plurality of pieces of direction identifying data as the direction of the ridge, thereby reducing the influence of measurement error.

The direction identification part 524 may further identify the distance between the wheel 3 and the ridge on the basis of the direction identifying data. The direction identification part 524 identifies the distance between i) the boundary defined by the identified region of the ridge and the identified region of the furrow and ii) the position of the right side or the position of the left side of the wheel 3, as the distance between the wheel 3 and the ridge. The direction identification part 524 notifies the travel control part 525 of the identified direction of the ridge or the direction of the furrow and the distance between the wheel 3 and the ridge.

The travel control part 525 controls the agricultural vehicle S such that the agricultural vehicle S travels along the direction of the ridge identified by the direction identification part 524. The travel control part 525 controls the direction and the speed of the wheels 3 of the agricultural vehicle S on the basis of the direction of the ridge. The travel control part 525 controls the rotational speed or the orientation of each of the wheel 3L and the wheel 3R such that the agricultural vehicle S travels along the direction of the ridge notified from the direction identification part 524.

Further, the travel control part 525 may control the rotational speed or the orientation of the wheels 3 of the agricultural vehicle S on the basis of the distance identified by the direction identification part 524. The travel control part 525 controls the rotational speed or the orientation of the wheels 3 such that the distance between a wheel 3 and the ridge is within a predetermined range, for example.

Specifically, when the travel control part 525 detects that the distance between the wheel 3L and the ridge becomes larger than the predetermined range, the travel control part 525 changes the rotational speed of the wheel 3L to be greater than the rotational speed of the wheel 3R, or changes the orientation of the wheels 3 such that the distance between a wheel 3 and the ridge becomes smaller. Since the travel control part 525 operates in this manner, the agricultural vehicle S travels along the direction of the ridge. In addition, when the distance between a wheel 3 and the ridge is out of the predetermined range due to the change in the direction of the ridge, the agricultural vehicle S can quickly change the traveling direction to travel along the direction of the ridge.

It should be noted that when the direction identification part 524 is unable to identify the direction of the ridge, the travel control part 525 stops the agricultural vehicle S. The travel control part 525 may switch to traveling based on radio waves received from a GPS satellite when the direction identification part 524 is unable to identify the direction of the ridge. In a state where the direction identification part 524 is unable to identify the direction of the ridge, e.g., when the ridge is collapsed, the travel control part 525 operating in this manner makes it possible to prevent further collapse of the ridge resulting from the travel of the agricultural vehicle S.

<Flow of Process in Control Device 5>

Figure 5:
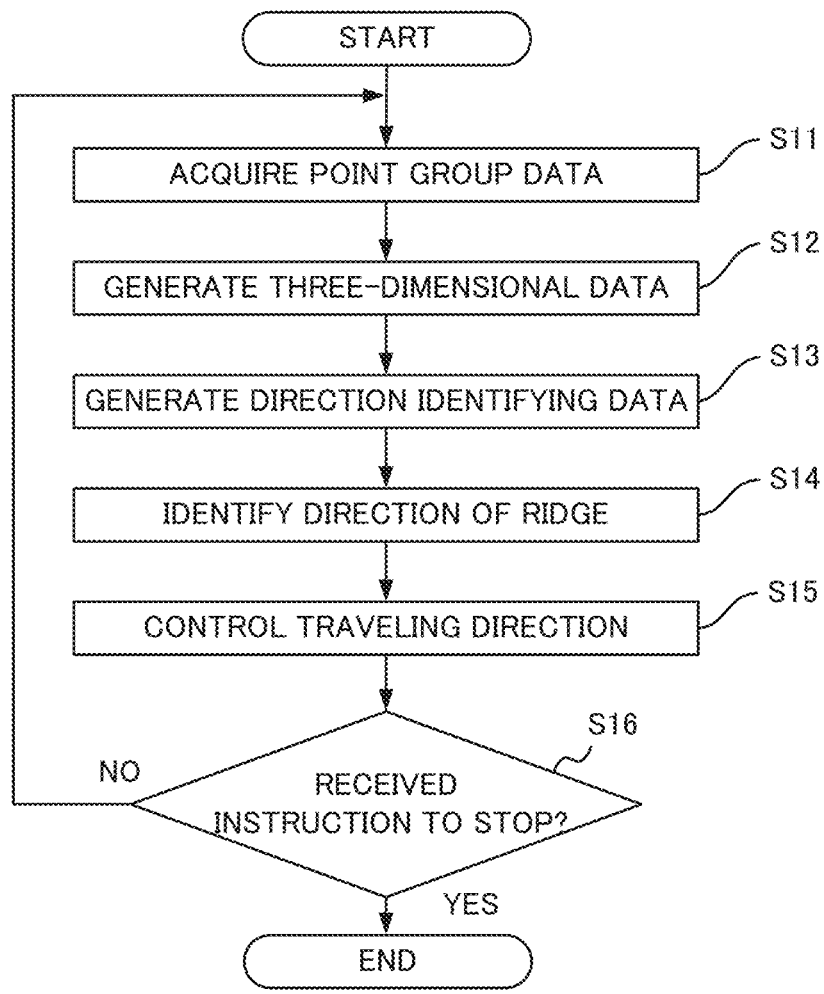
FIG. 5 is a flowchart showing a flow of a process in the control device.

FIG. 5 is a flowchart showing a flow of a process in the control device 5. The flowchart shown in FIG. 5 starts at the time when the control part 52 is activated.

The data acquisition part 521 acquires point group data at a predetermined interval (S11). The three-dimensional data generator 522 generates three-dimensional data on the basis of the point group data acquired by the data acquisition part 521 (S12), and the direction identifying data generator 523 generates direction identifying data by selecting point group data corresponding to a position lower than the upper surface of the ridge in the three-dimensional data (S13).

The direction identification part 524 identifies the direction of the ridge by identifying the boundary position between the ridge and the furrow on the basis of the direction identifying data (S14). The travel control part 525 controls the traveling direction of the agricultural vehicle S such that the agricultural vehicle S travels in the direction identified by the direction identification part 524 (S15).

The control part 52 monitors whether or not an instruction to stop the operation has been received (S16), and repeats the process from S11 to S16 until receiving the instruction to stop the operation (NO in S16). When the instruction to stop has been received (YES in S16), the control part 52 ends the operation.

First Variation Example

Figure 6:
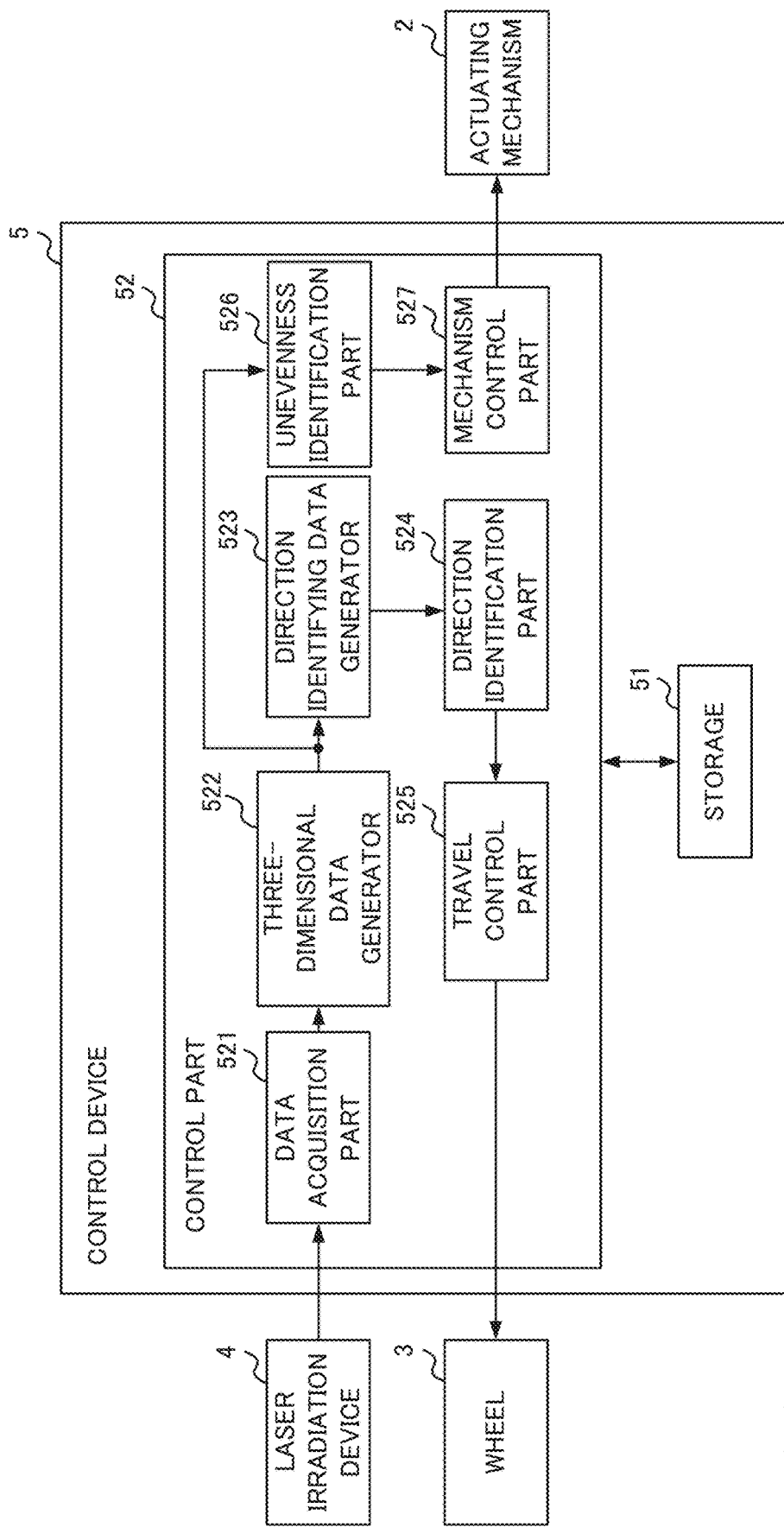
FIG. 6 shows a configuration of a variation example of the control device.

FIG. 6 shows a configuration of a variation example of the control device 5, The control device 5 shown in FIG. 6 is different from the control device 5 shown in MG. 2 in that the control device 5 further includes an unevenness identification part 526 and a mechanism control part 527, and is the same in other respects.

The unevenness identification part 526 identifies an unevenness of the furrow between a plurality of ridges on the basis of the acquired point group data acquired by the data acquisition part 521. On the basis of the position in the height direction of the point group data included in the three-dimensional data generated by the three-dimensional data generator 522 on the basis of the acquired point group data, the unevenness identification part 526 identifies the unevenness by identifying the height of each of a plurality of positions on the furrow in the traveling direction, with the lowest position on the furrow as a reference, for example.

The mechanism control part 527 controls the height of the actuating mechanism 2 which operates above the ridge in the agricultural vehicle S, on the basis of the unevenness identified by the unevenness identification part 526. When the position of the actuating mechanism 2 in the height direction also varies as the position of the agricultural vehicle S in the height direction varies due to the unevenness of the furrow, the height of the actuating mechanism 2 with respect to the position of the crop may vary. Due to this, if the actuating mechanism 2 has a mechanism for cutting a root of the crop, a furrow having a convex portion would cause the crop to be cut at a position higher than the root of the crop, for example.

On the other hand, since the mechanism control part 527 controls the actuating mechanism 2 such that the position of the actuating mechanism 2 in the height direction is within a fixed range in accordance with the unevenness of the furrow, the height of the actuating mechanism 2 with respect to the position of the crop does not vary. As a result, when the actuating mechanism 2 has a mechanism for cutting the root of the crop, the actuating mechanism 2 can cut the crop at approximately the same position.

It should be noted that the control device 5 shown in FIG. 6 need not include the unevenness identification part 526, and the mechanism control part 527 may control the position of the actuating mechanism 2 in the left-right direction on the basis of the direction of the ridge identified by the direction identification part 524. When the direction of the ridge varies by a threshold or more, the mechanism control part 527 changes the position of the actuating mechanism 2 used for spraying agrochemicals, in the left-right direction, or changes the position of a mechanism for cutting the root of the crop, in the left-right direction, for example. The mechanism control part 527 may change the position of the actuating mechanism 2 in the left-right direction on condition that the traveling direction of the agricultural vehicle S and the direction of the ridge deviate from each other by a threshold or more.

Second Variation Example

Although a case where the control device 5 is included in the agricultural vehicle S has been described in the above description, the control device 5 need not be included in the agricultural vehicle S. The control device 5 may have a communication function of transmitting and receiving data to and from an electronic device driving the wheel 3, and the travel control part 525 may control the traveling direction of the agricultural vehicle S by transmitting data indicating the traveling direction to the electronic device. In this case, the control device 5 is a smartphone, a tablet, or a personal computer, for example.

Third Variation Example

In the above description, a case where the travel control part 525 controls the position of the agricultural vehicle S in the left-right direction on the basis of the direction of the ridge identified by the direction identification part 524 has been described, but the travel control part 525 may perform other controls on the basis of the direction of the ridge identified by the direction identification part 524. The travel control part 525 controls travel torque of the agricultural vehicle S on the basis of the direction of the ridge, for example, Specifically, the travel control part 525 increases the travel torque when the direction of the ridge or furrow identified by the direction identification part 524 is inclined upward (that is, an upward slope) more than the travel torque when the direction of the ridge or furrow is inclined downward (that is, a downward slope). Since the travel control part 525 operates in this manner, the traveling speed of the agricultural vehicle S is stabilized regardless of the slopes of the field.

Fourth Variation Example

In the above description, the direction identifying data generator 523 generated direction identifying data including a portion of the point group data included in the three-dimensional data generated by the three-dimensional data generator 522, but the direction identifying data generator 523 may use the acquired point group data acquired by the data acquisition part 521 itself as the direction identifying data. In this case, the laser irradiation device 4 radiates laser light only over a range with a preset height (e.g., a range lower than the crops planted in the ridge). A process of converting the three-dimensional data into the direction identifying data becomes unnecessary since the laser irradiation device 4 and the direction identifying data generator 523 operate in this manner, making it possible to shorten the time required for the direction identification part 524 to identify the direction of the ridge.

Fifth Variation Example

Figure 7:
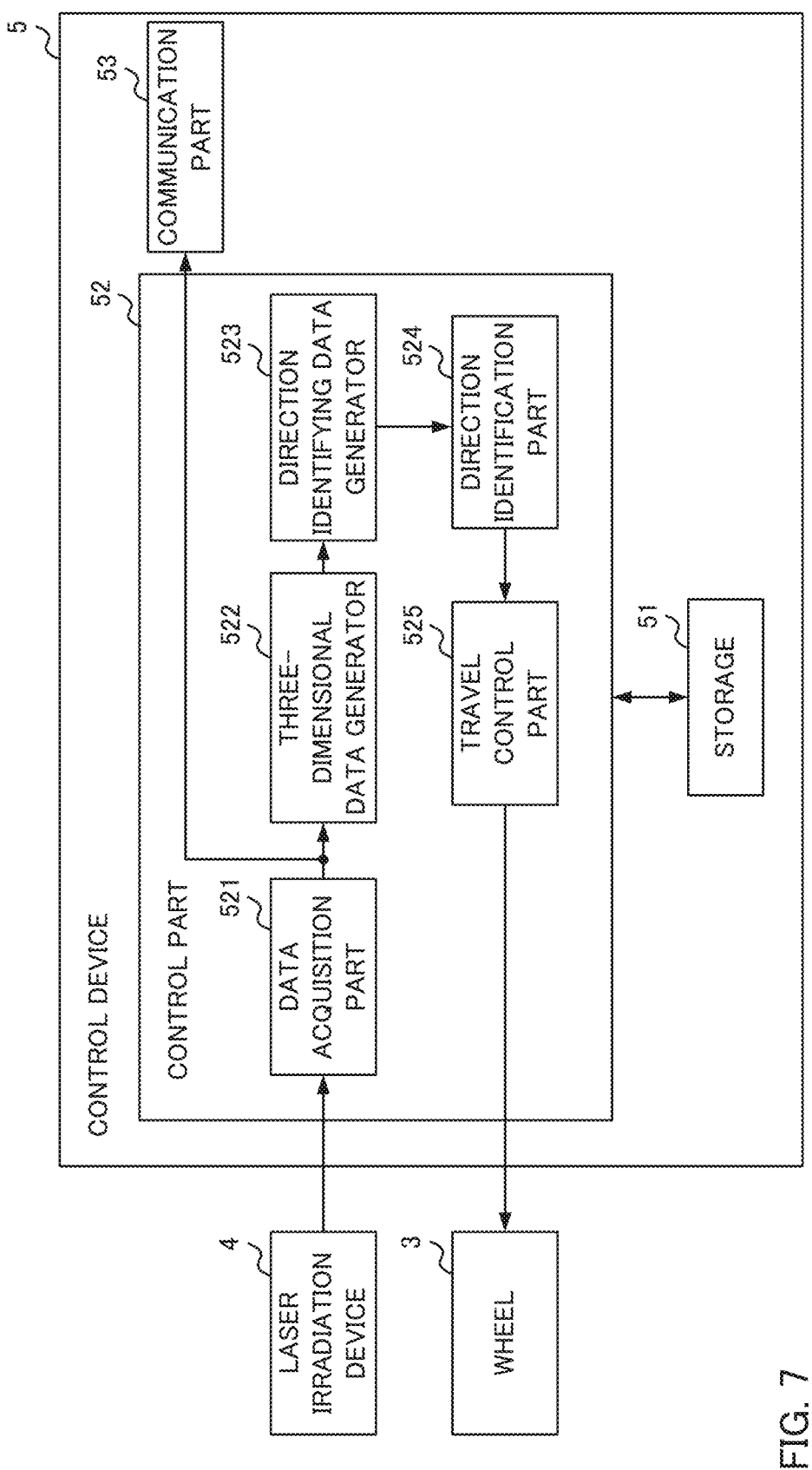
FIG. 7 shows another example of the control device.

FIG. 7 shows another example of the control device 5. The control device 5 shown in FIG. 7 is different from the control device 5 shown in FIG. 2 in that the control device 5 shown in FIG. 7 further includes a communication part 53, and is the same in other respects.

The communication part 53 has a wireless communication unit for transmitting and receiving data to and from another agricultural vehicle Sb traveling behind the agricultural vehicle S, for example. The communication part 53 transmits acquired point group data acquired from the laser irradiation device 4 to this other agricultural vehicle Sb traveling behind the agricultural vehicle S.

The agricultural vehicle Sb includes a control part which functions as a three-dimensional data generator 522, a direction identifying data generator 523, a direction identification part 524, and a travel control part 525. The agricultural vehicle Sb identifies the traveling direction on the basis of the acquired point group data received from the agricultural vehicle S, and travels in the identified direction. The agricultural vehicle S may transmit the three-dimensional data or the direction identifying data to the agricultural vehicle Sb via the communication part 53, and the agricultural vehicle Sb may travel on the basis of the received three-dimensional data or direction identifying data.

The direction identification part 524 of the agricultural vehicle Sb may identify the traveling direction using the acquired point group data, the three-dimensional data, or the direction identifying data at a timing delayed by a time determined on the basis of the distance between the agricultural vehicle S and the agricultural vehicle Sb, and the speed of the agricultural vehicle Sb, from when the acquired point group data, the three-dimensional data, or the direction identifying data is received from the agricultural vehicle S. Thus, the agricultural vehicle S transmits the acquired point group data, the three-dimensional data, or the direction identifying data to the agricultural vehicle Sb, thereby allowing the agricultural vehicle Sb to travel along the direction of the ridge even if the laser irradiation device 4 is not included in the agricultural vehicle Sb.

Sixth Variation Example

In the above description, it is assumed that the crops are planted in the ridge, but an object other than the crops may be put in the ridge. When a tunnel covering the crops is formed, the direction identification part 524 may identify the direction of the tunnel as the direction of the ridge, for example.

In such a case, it is assumed that the direction identification part 524 is unable to identify the direction of the ridge. When the direction identification part 524 is unable to identify the direction of the ridge, the direction identifying data generator 523 may expand the range of the point group data used as the direction identifying data.

Seventh Variation Example

In the above description, a case where a laser irradiation device 4 changes the irradiation direction of the laser light has been described, but the laser irradiation device 4 may be provided with multiple light sources, arranged in the height direction of the agricultural vehicle, that radiate the laser light in the horizontal direction, and a point group may be acquired as a result of radiating the laser light in the horizontal direction with these multiple light sources.

Eighth Variation Example in the above description, a case where the agricultural vehicle S has the laser irradiation device 4 and the direction of the ridge is identified on the basis of the point group data generated on the basis of the laser light radiated by the laser irradiation device 4 has been described. Using the laser light enables the agricultural vehicle S to drive autonomously and to perform farm work regardless of weather and the like, even on rainy days or in poor visibility. However, means for acquiring the point group data by the agricultural vehicle S is not limited to the laser irradiation device 4, and may be means capable of acquiring the shape of the ridge as the point group data. The agricultural vehicle S may acquire point group data with a stereo camera (a compound-eye camera) capable of generating distance data indicating a distance to a subject, for example.

When the agricultural vehicle S has a stereo camera, the stereo camera identifies the distance from the camera to the subject on the basis of the distance between two pixels (parallax) corresponding to the position of the same subject in two captured images obtained by photographing the front of the agricultural vehicle S with two cameras, for example. The stereo camera inputs data, indicating the distance from the camera to the subject corresponding to each pixel as point group data, into the control device 5. The three-dimensional data generator 522 generates three-dimensional data indicating a three-dimensional geometry of a region corresponding to the imaging range of the stereo camera. As just described, even when the agricultural vehicle S has a stereo camera, the direction of the ridge can be identified by a similar process as in a case where the agricultural vehicle S has the laser irradiation device 4.

<Effects of Agricultural Vehicle S>

As described above, the agricultural vehicle S is provided with the laser irradiation device 4 that radiates pulsed laser light to the front in the traveling direction. The control device 5 identifies the direction of the ridge in the field where the agricultural vehicle S travels, on the basis of the point group data acquired by the laser irradiation device 4 that radiates the laser light, and controls the agricultural vehicle S such that the agricultural vehicle S travels in the identified direction. Having such a configuration, the agricultural vehicle S can travel on the basis of the direction of the identified ridge, and therefore the agricultural vehicle can travel along the direction of the ridge without frequently moving in the left-right direction when a part of the ridge is collapsed or the ridge is uneven.

Further, since the agricultural vehicle S can change the travel torque in accordance with the slope by detecting a change of the ridge and the furrow in the height direction, the traveling performance can be improved. Further, the agricultural vehicle S can stop when there is a steep downward slope by detecting a change of the ridge and the furrow in the height direction, thereby improving safety.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured to be functionally or physically distributed and integrated in arbitrary units. Further, new exemplary embodiments generated by arbitrary combinations of them are included in the exemplary embodiments of the present disclosure. The effect of the new embodiment caused by the combination has the effect of the original embodiment together.

What is claimed is:

1. A control device for controlling an agricultural vehicle, the control device comprising:
    a direction identifying data generator that generates direction identifying data including point group data for a predetermined range of a region including a ridge;
    a direction identification part that identifies a direction of the ridge on the basis of the direction identifying data; and
    a travel control part that controls the agricultural vehicle on the basis of the direction of the ridge identified by the direction identification part, wherein
    the travel control part stops the agricultural vehicle when the direction identification part is unable to identify the direction of the ridge.

2. The control device according to claim 1, further comprising a three-dimensional data generator that generates three-dimensional data indicating a three-dimensional geometry of the region on the basis of the point group data, wherein
    the direction identifying data generator generates the direction identifying data by extracting a portion of the point group data corresponding to the predetermined range effective for identifying the direction of the ridge, from among the point group data included in the three-dimensional data.

3. The control device according to claim 2, wherein
    the point group data is data acquired by radiating a pulsed laser light from a laser light irradiation source, and
    the three-dimensional data generator generates the three-dimensional data corresponding to the three-dimensional geometry of the region with a horizontal plane as a reference by converting the position of the point group data in three-dimensional space on the basis of the relationship between the position of the laser light irradiation source and the irradiation position of the laser light.

4. The control device according to claim 2, wherein
    the direction identifying data generator generates the direction identifying data by selecting the portion of the point group data corresponding to the predetermined range lower than the upper surface of the ridge, from among the point group data included in the three-dimensional data.

5. The control device according to claim 1, further comprising:
    an unevenness identification part that identifies unevenness in a furrow between a plurality of the ridges on the basis of the point group data; and
    a mechanism control part that controls a height of an actuating mechanism operating above the ridge with respect to the agricultural vehicle on the basis of the unevenness identified by the unevenness identification part.

6. The control device according to claim 1, further comprising:
    a mechanism control part that controls a position of an actuating mechanism, in the left-right direction, that operates above the ridge with respect to the agricultural vehicle on the basis of the direction of the ridge identified by the direction identification part.

7. The control device according to claim 1, wherein the direction identifying data generator generates the direction identifying data by selecting the point group data within a range defined by an upper surface and a lower surface parallel to a horizontal plane of the agricultural vehicle.

8. The control device according to claim 1, wherein the direction identifying data generator generates a plurality of pieces of the direction identifying data including the point group data corresponding to a plurality of predetermined ranges lower than the ridge, with each piece of the point group data corresponding to the same height range, and
the direction identification part identifies the direction of the ridge on the basis of the plurality of pieces of direction identifying data.

9. The control device according to claim 1, wherein the direction identification part identifies the direction of the ridge on the basis of a direction of an outline of a region formed by the point group data corresponding to a predetermined height included in the direction identifying data.

10. The control device according to claim 1, wherein the travel control part controls an orientation and a speed of a wheel of the agricultural vehicle on the basis of the direction of the ridge.

11. The control device according to claim 10, wherein the direction identification part further identifies a distance between the wheel and the ridge on the basis of the direction identifying data, and
the travel control part controls the orientation and the speed of the wheel of the agricultural vehicle on the basis of the distance identified by the direction identification part.

12. The control device according to claim 1, further comprising:
a communication part that transmits the point group data to another agricultural vehicle traveling behind the agricultural vehicle.

13. A control method implemented by a computer for controlling an agricultural vehicle, comprising the steps of:
generating direction identifying data including point group data for a predetermined range of a region including a ridge;
identifying a direction of the ridge on the basis of the direction identifying data;
controlling the agricultural vehicle on the basis of the identified direction of the ridge; and
stopping the agricultural vehicle when the direction identification part is unable to identify the direction of the ridge.

14. An agricultural vehicle, comprising:
a control device that controls the agricultural vehicle; and
a laser irradiation device that transmits point group data generated by radiating pulsed laser light in front of the agricultural vehicle in a traveling direction, to the control device, wherein
the control device includes:
a direction identifying data generator that generates direction identifying data including point group data for a predetermined range of a region including a ridge;
a direction identification part that identifies a direction of the ridge on the basis of the direction identifying data; and
a travel control part that controls the agricultural vehicle on the basis of the direction of the ridge identified by the direction identification part, wherein
the travel control part stops the agricultural vehicle when the direction identification part is unable to identify the direction of the ridge.

* * * * *